F. A. STEVENS.
SPECTACLES.
APPLICATION FILED JULY 15, 1911.
1,038,675.
Patented Sept. 17, 1912.
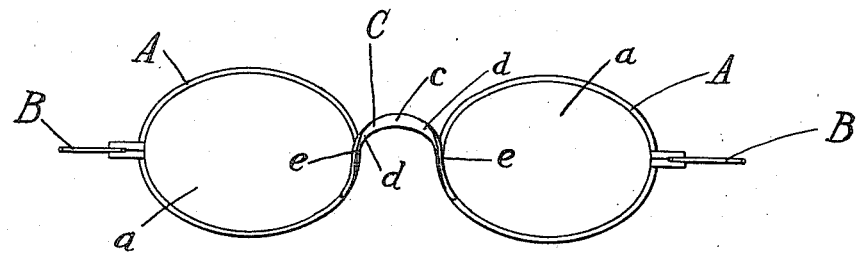
Fig. 1.
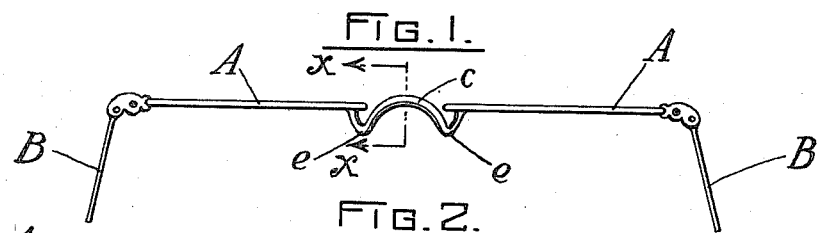
Fig. 2.
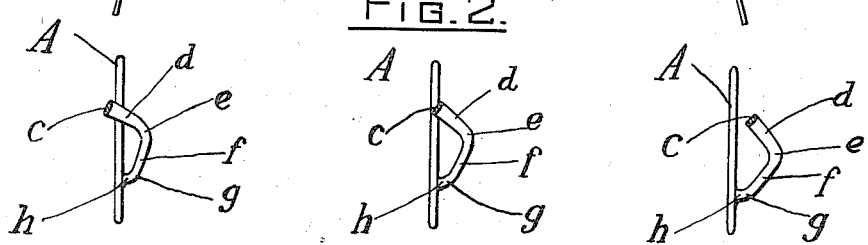
Fig. 3.    Fig. 4.    Fig. 5.
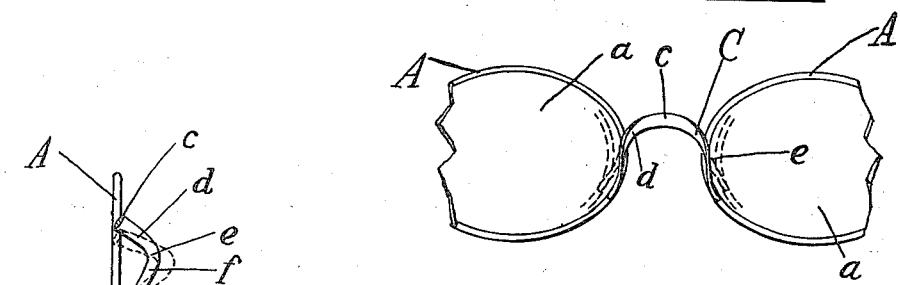
Fig. 6.    Fig. 7.
Fig. 8.
Fig. 9.
WITNESSES
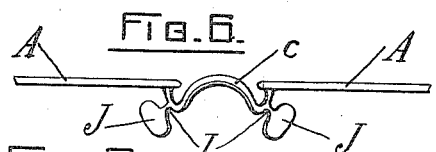
INVENTOR.
Frederick A. Stevens
By Horatio E. Bellows
ATTORNEY.

UNITED STATES PATENT OFFICE.

FREDERICK A. STEVENS, OF PROVIDENCE, RHODE ISLAND.

SPECTACLES.

1,038,675.

Specification of Letters Patent.   Patented Sept. 17, 1912.

Application filed July 15, 1911. Serial No. 638,623.

*To all whom it may concern:*

Be it known that I, FREDERICK A. STEVENS, a citizen of the United States, residing at Providence, in the county of Providence and State of Rhode Island, have invented certain new and useful Improvements in Spectacles, of which the following is a specification.

My invention relates to spectacles, and more particularly to the bridge portion.

The essential objects of my invention are to provide a maximum capacity adjustment both as regard to focal position of the lenses and to the physical characteristics of the wearer; to insure in a single type of combined bridge and guard a universal adjustment, that is to say adjustment in a horizontal plane toward and away from and beyond the plane of the lenses, adjustment in a vertical plane, adjustment right and left in the plane of the lenses, and adjustment of the angle of vertical convergence of the crest of the bridge.

Other objects are facility of adjustment, and simplicity and inexpensiveness of construction.

Figure 1 is a rear view of a pair of spectacles embodying my invention, with portions of the temples broken away. Fig. 2 a top plan view of the same, Figs. 3, 4, and 5, sections of the same on line $x$—$x$ of Fig. 1, showing the bridge in adjusted positions of "out," "on," and "in," respectively. Fig. 6, a like section of the same corresponding with Fig. 4 and showing in broken lines a downward adjustment of the bridge, Fig. 7, a rear view of the spectacles with parts broken away and showing in broken lines positions of adjustment for varying pupilary distances. Fig. 8, a plan view of the same, and Fig. 9, a similar view of a modified form of bridge portion.

Like characters of reference indicate like parts throughout the views.

In the drawings, A, indicates the supports, and, *a*, the lenses of a pair of spectacles of the rim type in conjunction with which my invention is used. My invention is also applicable to the rimless type. The temples B may be of any usual desired construction.

The bridging portion C is composed of pliable or flexible material, and in detail comprises a crest or arched portion, *c*, inclined rearwardly and downwardly forming arms, *d*, which have an angular bend, *e*, and extend at an inclination downwardly and forwardly forming shank portions, *f*, each provided with a bend, *g*, and extending horizontally forward and slightly outwardly forming horizontal portions, *h*, integral with or soldered to the lens supports A at points below the horizontal axes of the lenses. The construction of the bridge portion C is such that combined with the pliable material thereof the portions *d*, *e*, *f*, may be made to conform to the sides of the nose and form in effect an extended side bearing whereby the weight may be taken from the crest, *c*, and the usual abrasion of the nose below the crest of the bridge be thus avoided.

Without impairing the engagement of the bridge portions *c*, *d*, *e*, and *f* to the sides of the nose, these parts are capable of being swung to various positions transversely of the planes of the lenses, by bending the portions *h* or opening the bend *g*. Adjustment to the three most necessary positions of "out", "on", and "in", are shown respectively in Figs. 3, 4, and 5. In "out" position the crest *c* is in front of the plane of the frames; in "on" position, in the plane of the frames; and in "in" position, at the rear of the plane.

Without lessening the grip of the portions *d*, *e*, *f*, of the bridge portion, the latter is capable of vertical adjustment. This is illustrated in broken lines in Fig. 6 which indicate a lower position of the crest by depressing the arms, *d*, at the bend *e*.

Adjustment of the lens supports toward and away from each other as is desirable in adjustment for pupilary distance may also be attained by manipulation of the bridge portion alone without destroying conformation of the latter to the sides of the nose. This is attained by bending outwardly the portions *h*, *g*, and the lower parts of the portions *f*, as illustrated in Figs. 7 and 8.

It is sometimes convenient to employ the modified form of my invention shown in Fig. 9 which includes supplemental supports J connected by arms I integral with or soldered to the shank portions, *f*, or the bridge. These auxiliary nose supports are also of pliable material and are capable of adjustment to angular convergence, or may be tilted forward and back, or may be distended.

What I claim is:—

1. In spectacles, the combination with the lens supports, of an arched portion comprising inclined arms provided with bends connected with the lens supports, and auxiliary supports rigidly connected with the arms.

2. In spectacles, the combination with the lens supports, of an arched portion comprising rearwardly directed arms provided with angular bends connected with the lens supports, and auxiliary supports rigidly connected to the arms.

3. In spectacles, the combination with the lens supports, of an arched portion comprising rearwardly and downwardly inclined arms provided with angular bends and continued forwardly from the said bends to form shanks connected with the lens supports, and auxiliary supports connected with the shanks.

4. In spectacles, the combination with the lens supports, of an arched portion comprising rearwardly and downwardly inclined arms provided with angular bends and continued downwardly and forwardly from said bends to form shanks connected with the lens supports, auxiliary supports, and arms connecting the auxiliary supports to the shanks.

5. In spectacles, the combination with the lens supports and lenses, of an arched portion comprising rearwardly inclined arms provided with bends, downwardly and forwardly inclined shanks integral with the lens supports at points below the horizontal axes of the lens supports, auxiliary supports, and arms connecting the auxiliary supports to the shanks.

6. In spectacles, the combination with the lens supports, of an arched portion comprising rearwardly inclined arms continued at an inclination forwardly and downwardly to form shanks, said shanks being provided with bends and horizontally extended to unite with the lens supports, auxiliary supports, and arms connecting the auxiliary supports with an intermediate portion of the shanks.

7. In spectacles, the combination with the lens supports, of a combined pliable bridging and guard portion comprising in a single piece an arched portion consisting of inclined rearwardly directed arms, forwardly and downwardly directed shanks integral with the arms, horizontal portions integral with the lower ends of the shanks fixed to the lens supports, auxiliary supports, and arms connected to the lens supports.

In testimony whereof I have affixed my signature in presence of two witnesses.

FREDERICK A. STEVENS.

Witnesses:
HORATIO E. BELLOWS,
GEORGE H. McLAUGHLIN.